No. 861,273. PATENTED JULY 30, 1907.
E. EICHLER.
MACHINE FOR BOXING MATCHES.
APPLICATION FILED SEPT. 1, 1906.

7 SHEETS—SHEET 2.

Witnesses: Inventor
Emil Eichler.
By Augustus B. Stoughton.
Atty.

No. 861,273. PATENTED JULY 30, 1907.
E. EICHLER.
MACHINE FOR BOXING MATCHES.
APPLICATION FILED SEPT. 1, 1906.

7 SHEETS—SHEET 4.

Witnesses
Inventor
Emil Eichler
By Augustus B. Stoughton
Atty.

No. 861,273. PATENTED JULY 30. 1907.
E. EICHLER.
MACHINE FOR BOXING MATCHES.
APPLICATION FILED SEPT. 1, 1906.
7 SHEETS—SHEET 5.
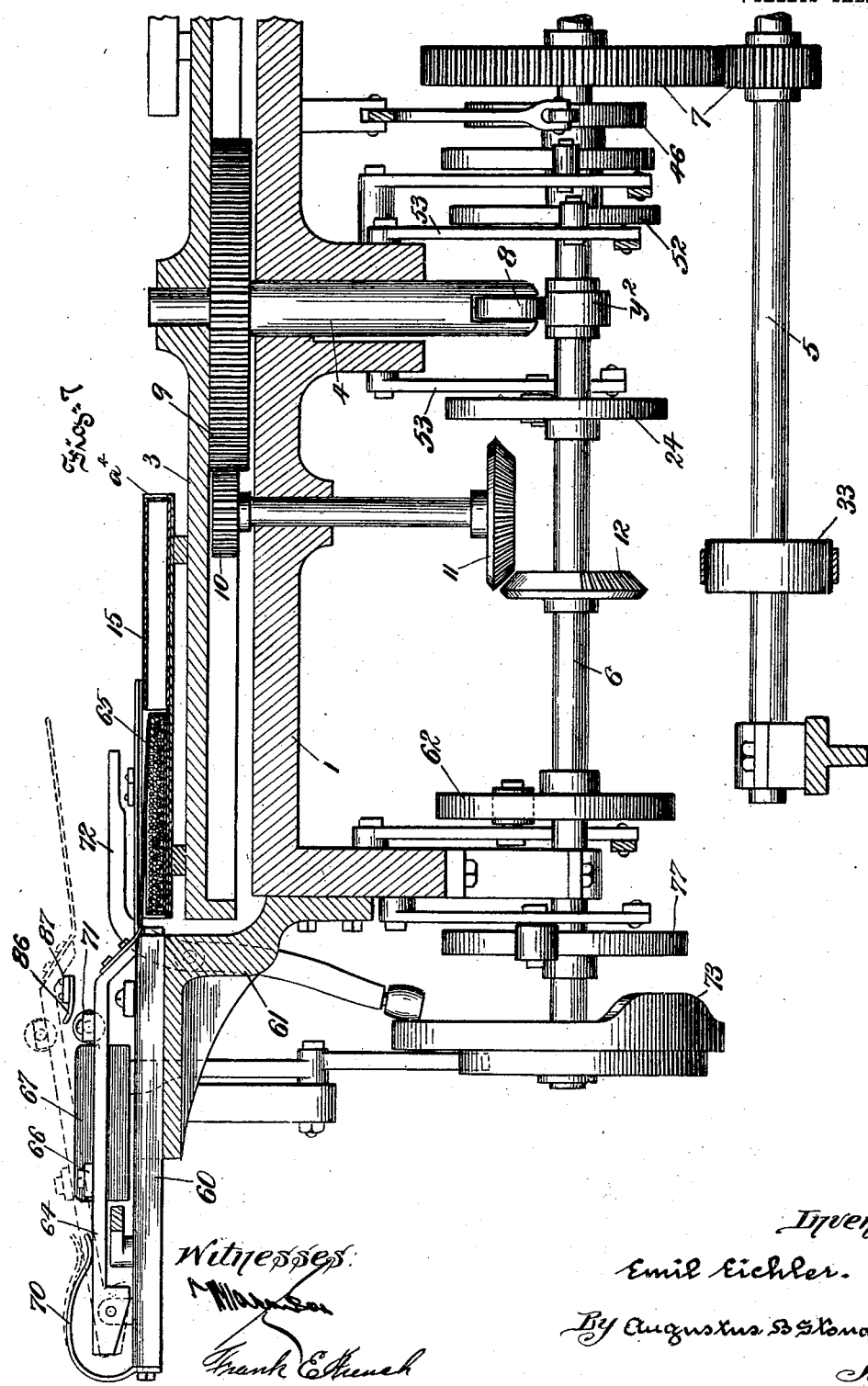
Witnesses:
Inventor:
Emil Eichler.
By Augustus B. Stoughton
Atty.

No. 861,273. PATENTED JULY 30, 1907.
E. EICHLER.
MACHINE FOR BOXING MATCHES.
APPLICATION FILED SEPT. 1, 1906.
7 SHEETS—SHEET 6.
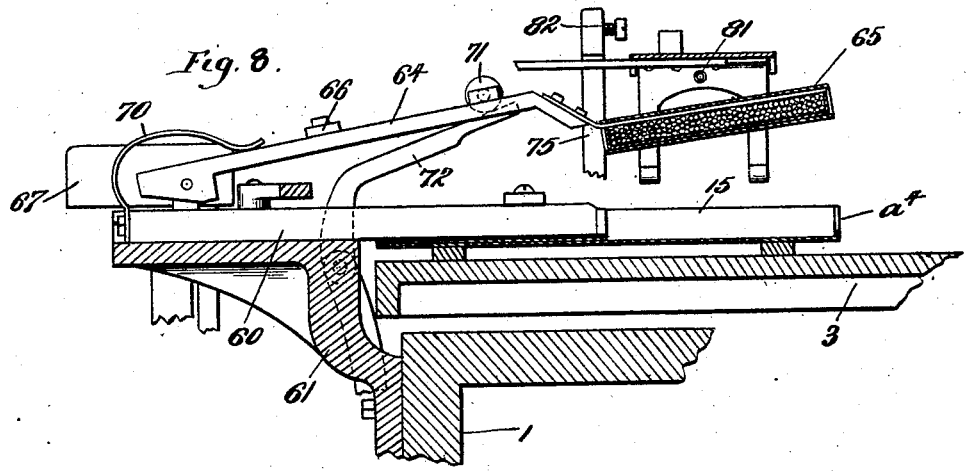
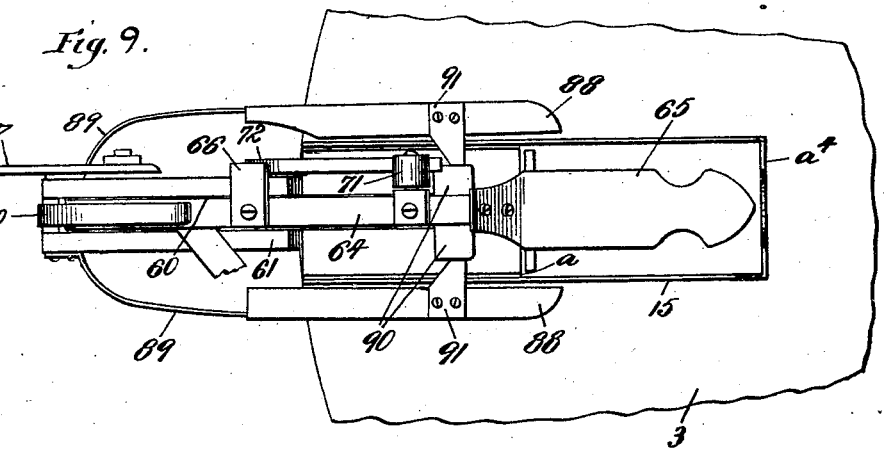
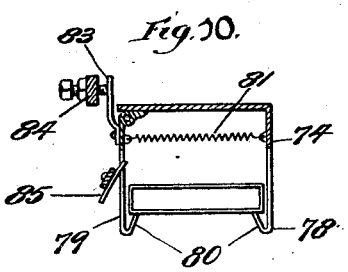
Witnesses
Inventor
Emil Eichler
By Augustus B. S. Houghton
Atty.
THE NORRIS PETERS CO., WASHINGTON, D. C.

No. 861,273. PATENTED JULY 30, 1907.
E. EICHLER.
MACHINE FOR BOXING MATCHES.
APPLICATION FILED SEPT. 1, 1906.
7 SHEETS—SHEET 7.
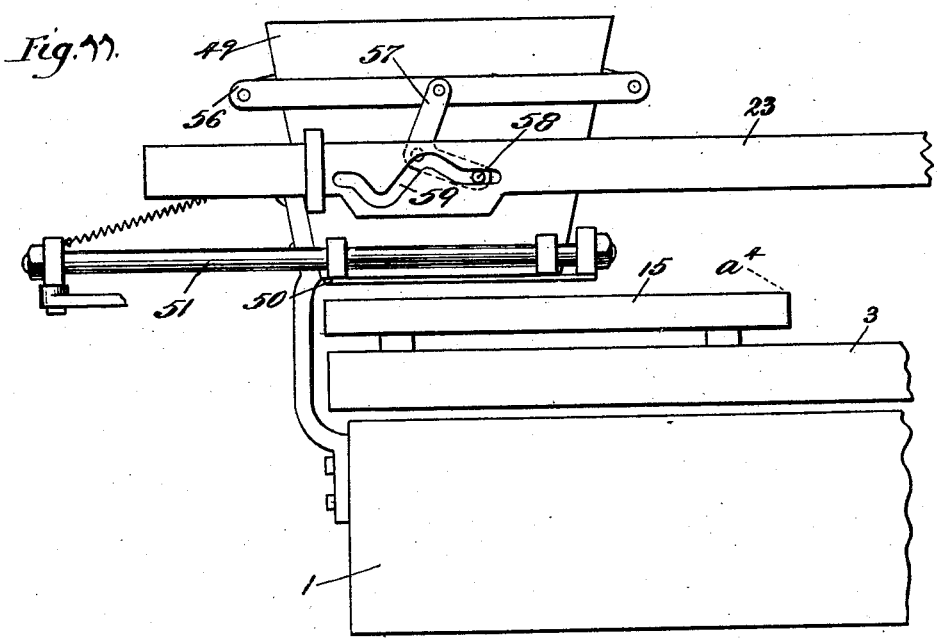
Fig. 11.
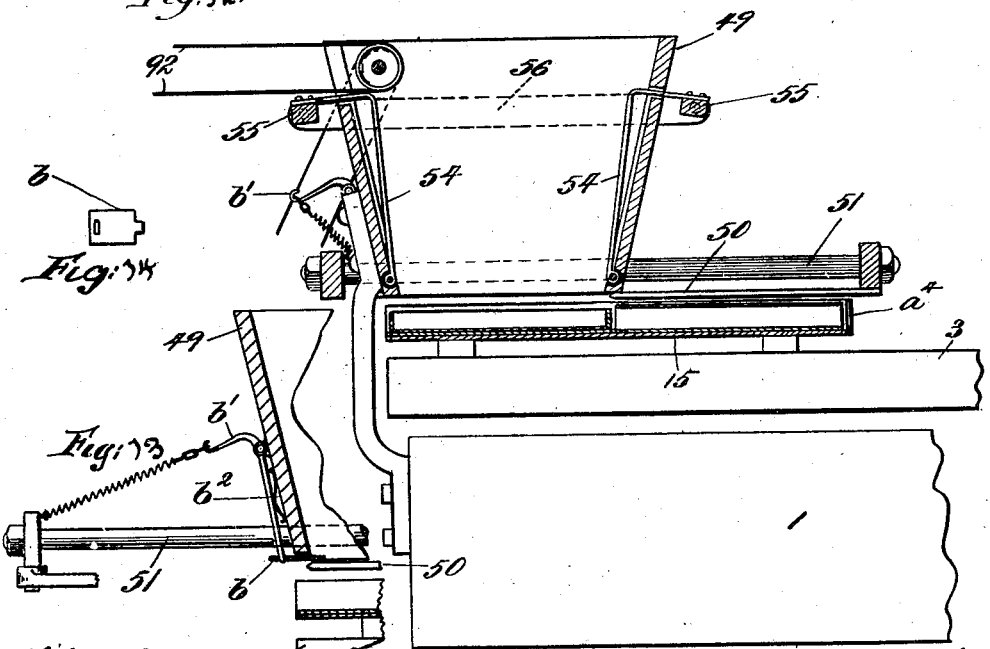
Fig. 12.
Fig. 14.
Fig. 13.
Witnesses
Inventor
Emil Eichler
By Augustus B. Stoughton
Atty.

UNITED STATES PATENT OFFICE.

EMIL EICHLER, OF PHILADELPHIA, PENNSYLVANIA.

MACHINE FOR BOXING MATCHES.

No. 861,273.  Specification of Letters Patent.  Patented July 30, 1907.

Application filed September 1, 1906. Serial No. 332,893.

*To all whom it may concern:*

Be it known that I, EMIL EICHLER, a subject of the Emperor of Germany, residing in Philadelphia, in the county of Philadelphia and State of Pennsylvania, have invented certain new and useful Improvements in Machines for Boxing Matches, of which the following is a specification.

My invention relates to a new and useful improvement in machines for boxing matches, and has for its object to provide a machine which will automatically feed the cases and the drawers, either separately or assembled, of the match-boxes to the machine, fill the drawers of the match-boxes with matches, insert the drawer containing the matches in the case and deliver the complete box.

Further objects and advantages of the invention will appear from the following description, and the invention will be defined by the annexed claims.

Reference is to be had to the accompanying drawings, forming a part of this specification, in which similar characters of reference indicate corresponding parts in all the figures.

Figure 1:
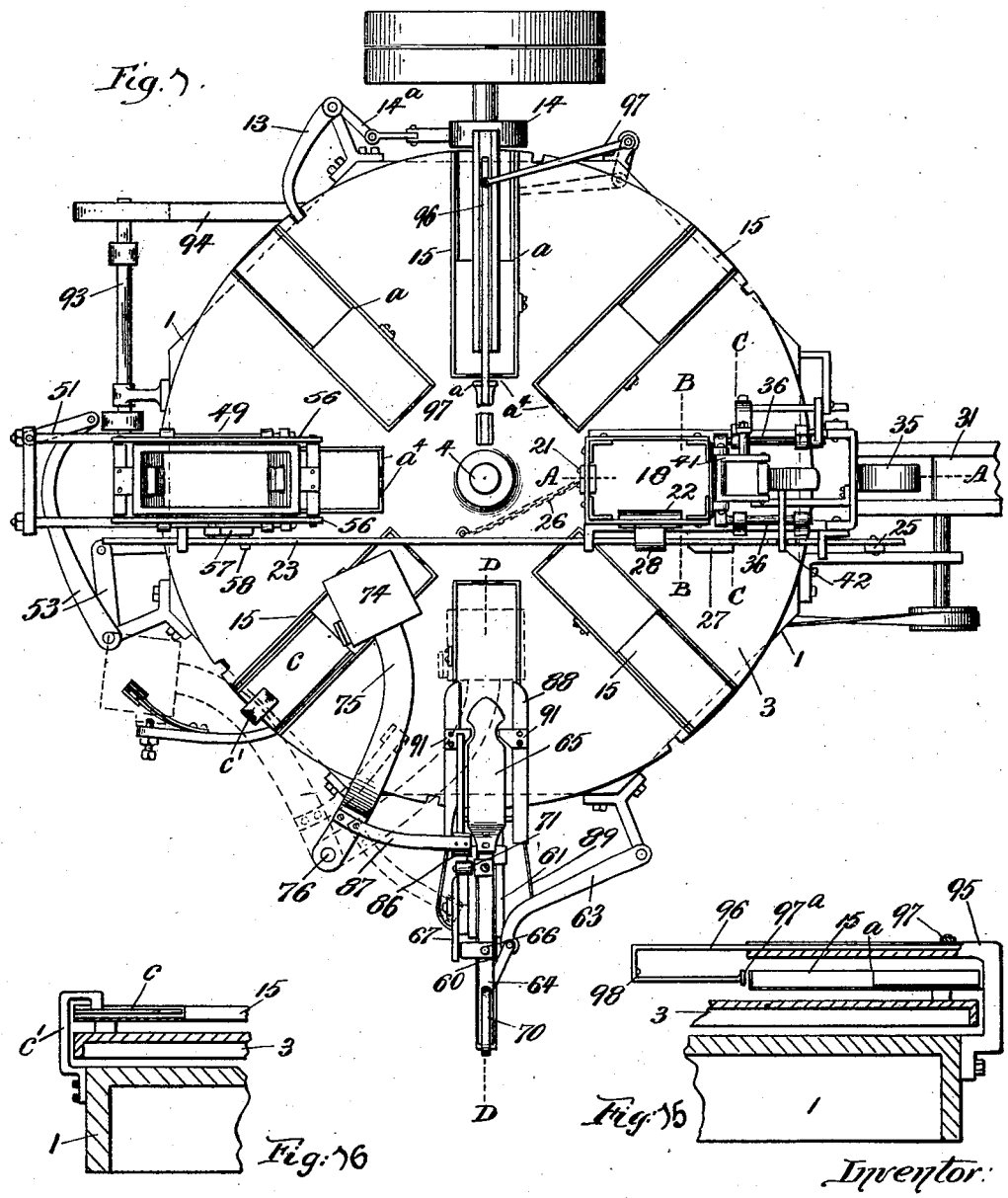
Figure 2:
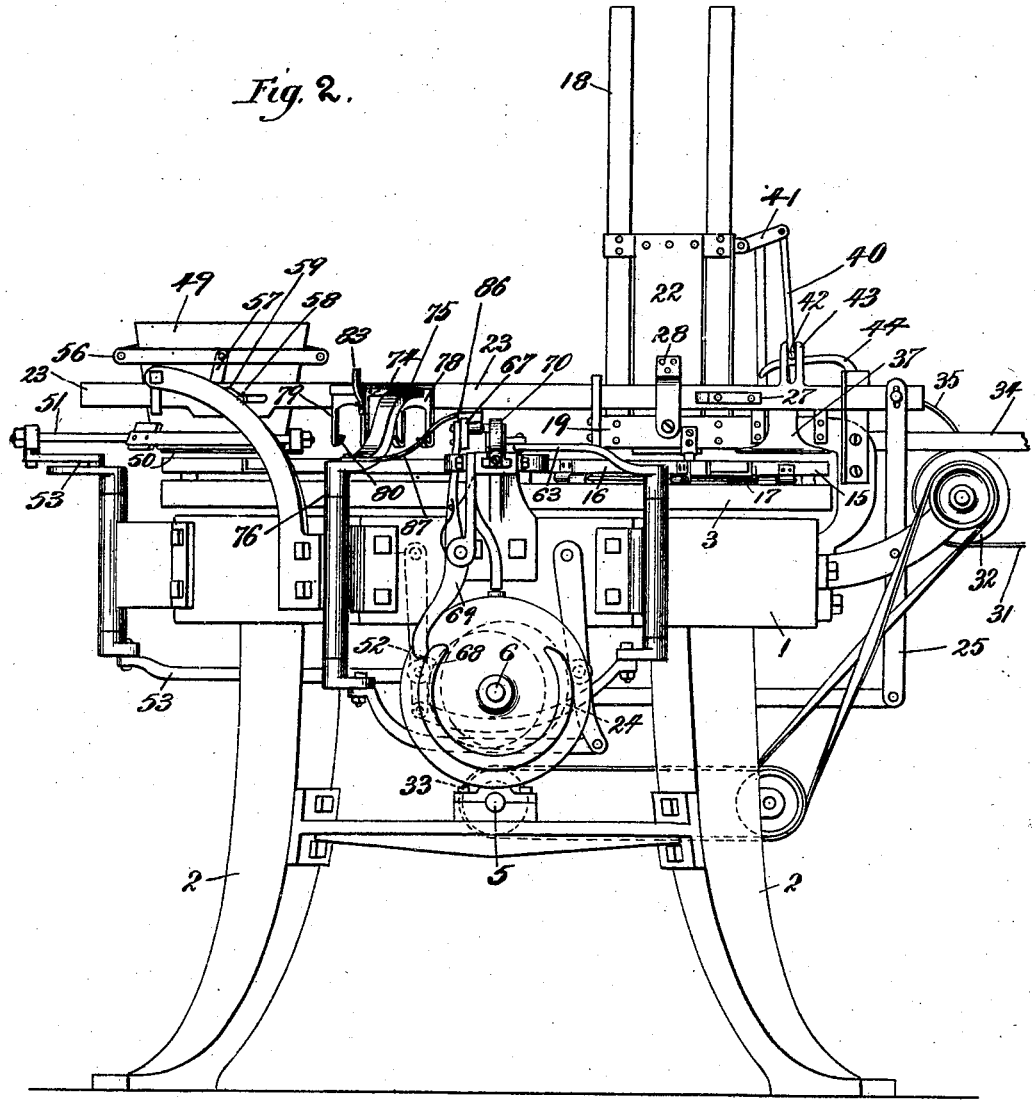
Figure 3:
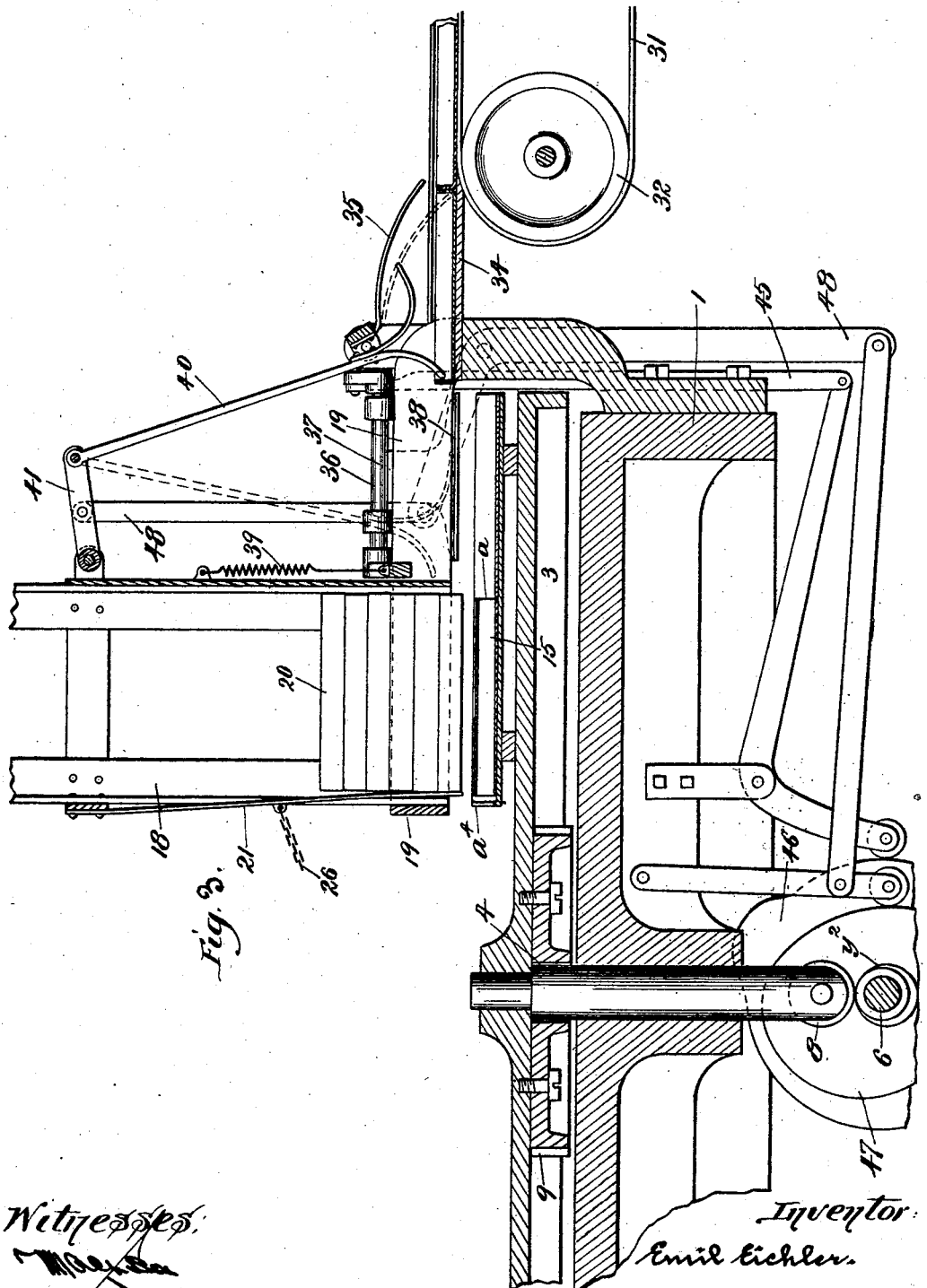
Figure 4:
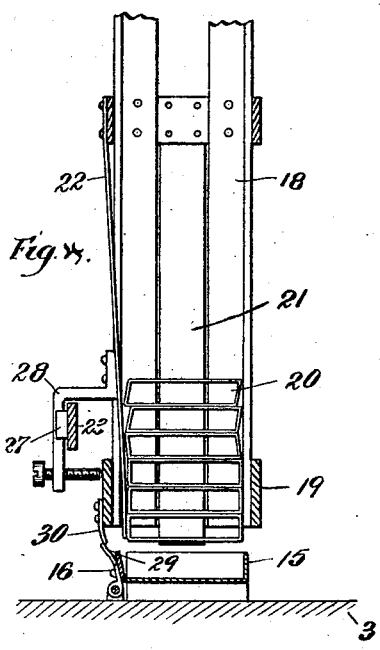
Figure 5:
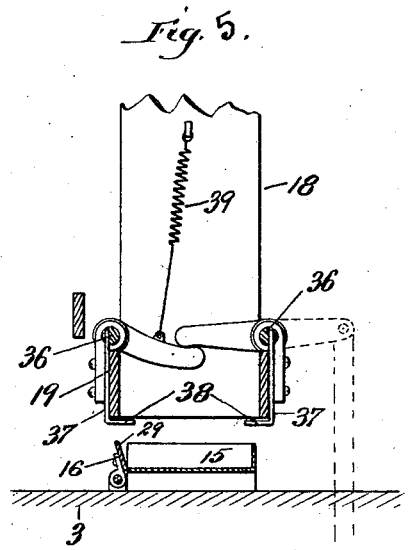
Figure 6:
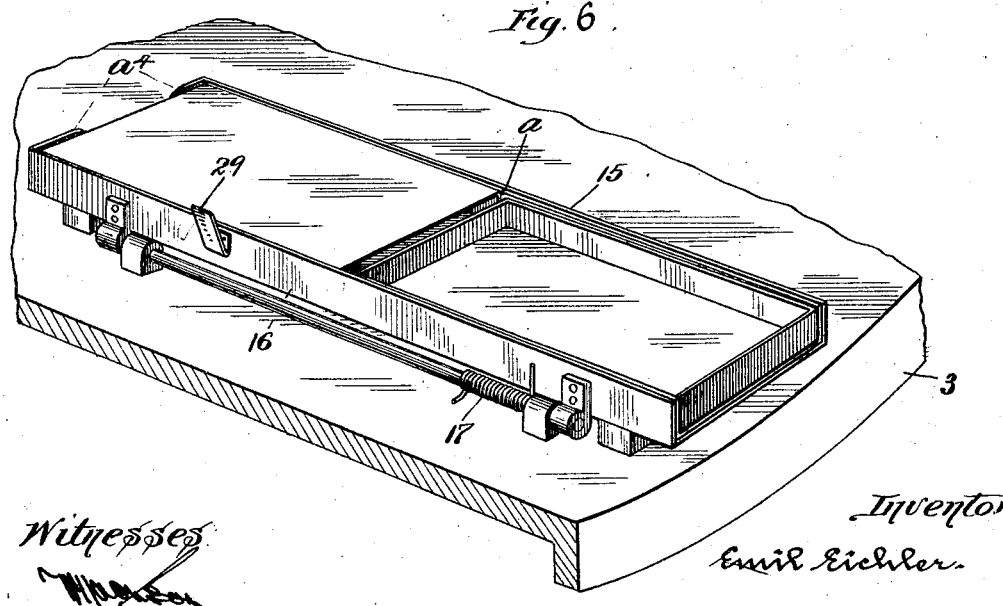

Figure 1, represents a plan view of the machine. Fig. 2, is a front elevation of the same. Fig. 3, an enlarged section taken on the line A—A of Fig. 1. Fig. 4, an enlarged section taken on the line B—B of Fig. 1. Fig. 5, an enlarged detail section taken on the line C—C of Fig. 1, looking toward the front of the chute containing the cases of the match-boxes; Fig. 6, is a perspective view of one of the trays for receiving the two parts of the match-box. Fig. 7, is an enlarged section taken on the line D—D of Fig. 1, showing the drawer of the box about to be inserted within the case. Fig. 8, is a similar view to Fig. 7, showing the matchbox with matches raised to be engaged by the jaws of the carrier. Fig. 9, is a plan view of the parts shown in Fig. 8, without the carrier and the match-box. Fig. 10, is a cross-section through the jaws of the carrier. Fig. 11, is a side elevation of the match-delivering apparatus. Fig. 12, is a longitudinal section through the match-delivering apparatus. Fig. 13, is a sectional view showing details of construction of the match-delivering apparatus. Fig 14, is a top view of a finger shown in Fig. 13. Fig. 15, is a sectional view of a box opener shown at the top of Fig. 1, and Fig. 16, is a similar view of a match evener shown to the left in Fig. 1.

In carrying out my invention I employ a stationary frame 1, which in reality is the bed-plate of the machine, and for convenience I make the same octagonal in shape, as shown in Fig. 1. This bed-plate or frame 1, is supported by suitable legs 2, extending downward therefrom. Located above the bed-plate is the circular revolving table 3, and this table is journaled at the center upon the reduced upper end of a vertically reciprocating stud 4, this stud 4, is keyed or otherwise secured in the frame so that it may slide and still not revolve, the table being upheld by resting upon the shoulder formed by reducing the upper end of the stud.

5, is the power shaft of the machine driven from any suitable source of power.

6, is the cam-shaft also journaled in the framework of the machine, this cam-shaft being driven from the power-shaft by suitable gears 7, so proportioned as to give to the cam-shaft the proper speed of revolution, and located upon the cam-shaft is a cam $y^2$, upon which a roller 8, journaled in the lower end of the stud 4, rests. As the cam-shaft revolves the table will be thus raised and lowered at the proper predetermined times. This table is designed to revolve intermittently, and while the table is stationary the different operations take place, and in order to revolve the table intermittently any suitable means can be employed, here shown as by means of a gear 9, which is secured to the underside of the table 3, and this gear is in mesh with another smaller gear 10, secured to the upper end of a vertical shaft journaled in the bed-plate. Upon the lower end of the shaft upon which the gear 10, is located is a beveled wheel 11, which may mesh with the mutilated gear 12, located upon the cam-shaft 6. The table is designed to move one step with each full revolution of the cam-shaft.

In order to lock the table while at rest any suitable automatic means can be provided, here shown as a latch 13, Fig. 1, adapted to engage notches formed in the periphery of the table, this latch being moved out of engagement with the notches at the proper time by a cam 14, located upon the cam-shaft and acting through a link $14^a$.

Upon the upper surface of the table are arranged trays 15, there being one tray for each movement of the table in a complete revolution, as for instance the machine shown in the drawings is designed to have eight intermittent movements during one revolution of the table, and therefore there are eight trays. These trays are of the same width as the match-boxes and long enough to contain both the case and the drawer of the box arranged end to end and separated from one another. These trays are arranged radially upon the table, and consist of a bottom, two sides and one end, which may be centrally cut away to form wings $a^4$; the end nearest the periphery of the table being open. One side of the tray, shown at 16, is hinged or pivoted to the table, as shown in Fig. 6, the side being held normally vertical and upright by a spring 17, thus the side can be tilted outward to receive the box parts, and then when released will spring inward and thus hold the box parts about midway of the tray, the cross-section becomes smaller to receive the drawer of the box and abutments $a$, are thus formed.

18, represents an upright hopper for containing the cases of the match-boxes (Fig. 3) which are arranged one above the other within the hopper, and this hopper may be supported in any suitable manner from the bed-plate, here shown as by means of the bracket 19, extending upward from the bed-plate and passing upon each side of the hopper.

20, represents the box cases, and these cases are held at one side and end in position by means of the flat springs 21 and 22, shown in Figs. 3 and 4, these springs being secured at their upper ends to the hopper 18, and their lower or free ends normally press against the lowermost cases, and thus hold the pile of cases by friction. These springs while holding the cases within the hopper also help to keep the cases straight and square, as shown in Fig. 4, and these springs are designed to be pulled outward so as to release the pressure on the cases to let the bottommost case drop within a tray at the predetermined time.

23, is a bar which extends across the machine above the table, and is arranged in suitable stationary bearings to allow said bar to slide, and this bar is reciprocated back and forth at the proper time by a cam 24, located upon the cam-shaft, the movement being communicated to the bar through a suitable system of links and levers 25. When the bar slides toward the left a chain 26, connected at one end to the spring 21, and at the other end to the bar, serves to retract the spring 21, and release the pressure from the cases, and simultaneously with this a cam-block 27, secured upon the bar 23, passes behind an angular lug 28, extending outward from the spring 22, thus also pulling this spring outward and releasing the pressure upon the cases from the side. When the cases are fed in the tray the table rises just before the bar 23 moves to the left, and as soon as the friction is released the whole pile of cases descends by gravity and the lowermost case, of course, will fall into the rearward, i. e. the inner, end of the tray, the side 16, of the tray being previously tipped back by means of the lug 29, coming in contact with the finger 30, extending downward from one side of the frame 19, then before the tray begins to move away from underneath the hopper the springs are released by the movement to the right of the bar 23, thus engaging the remaining cases, and the table in descending leaves a free space in between the deposited case and the ones remaining in the hopper, as shown in Fig. 3. The drawer parts of the boxes may be assembled in the case parts and thus fed to the machine and when this is done, means to be described for opening the boxes are present. However, the parts may be fed separately and in such case the drawer parts of the boxes are fed to the machine along an endless belt 31, passing over a suitable pulley 32, journaled to a stationary portion of the machine, and this belt may be driven by any suitable means, here shown as by means of another belt extending to a pulley 33, upon the power-shaft 5. These drawer parts of the boxes when nearing the machine pass onto a platform 34, where their movement is arrested by a rocking finger 35, which engages the box part and holds it stationary for a short time. This finger is operated by the movement of the slide-bar 23, and will be hereinafter described. These box parts are fed in above the forward or outer end of the tray and between the two sides of the bracket 19, which supports the hopper 18.

Journaled above each side of the frame or bracket 19, is a shaft 36, shown in Figs. 3 and 5, and to each shaft is secured a plate 37, which extends downward, and the lower end turns inward at right-angles to form horizontal ledges 38. The inner edges of these ledges 38 are closer together than the width of the drawer part of the box, and these ledges are held in this position by means of a spring 39, the two shafts 36, being connected together in any way so that they will operate in unison. Thus the box drawers are brought into proper shape and thus held.

40, is an arm pivoted at its upper end to the outer end of a lever 41, the other end of said lever being pivoted to the hopper 18. This arm 40, is provided with a pin extending outward from the side thereof, which pin is engaged by a forked extension 43, extending upward from the slide-bar 23, so that when the slide-bar moves the arm 40, will be swung upon its pivot, and this arm in swinging toward the hopper will engage the forward drawer part of the box and slide it in so as to rest upon the horizontal ledges 38. Of course the movement of the belt 31, will then move the rest of the drawer parts forward, but the finger 35, will descend in time to arrest the movement of the forward box part and hold it in the exact position formerly occupied by the one just removed. The movement of this stop-finger 35, is accomplished through means of an arm 44, connected to the same pivot as that of the stop-finger, and this arm passing underneath the pin 42, extending outward from the arm 40, so that the movement of the pin 42, will accomplish the proper movement of the stop-finger.

When the drawer part of the box is fed in above the ledges 38, said ledges are spread by rocking the shafts 36, through a system of levers and links 45, connected to a crank upon one of the shafts and operated by a cam 46, located upon the cam-shaft; so as soon as these ledges are spread the arm 40, is lowered through a cam 47, on the cam-shaft operating a system of links and levers 48, connected to the lever 41, to which the arm 40, is pivoted, and the downward movement of this arm forces the drawer of the box into the tray forward of the case, of course then the feeding parts instantly resume their normal position, and as the table begins to revolve the lug 29, upon the movable side of the tray passes the finger 30, and this side springing to its normal position clamps the box parts in the tray and the filled tray moves with the table toward the match feeding apparatus. In the foregoing description it has been assumed that the drawer and case parts have been fed in separately, so that for the present a description of the box opening mechanism will not be given, since such mechanism plays no part where boxes already open are presented to it. Of course it is understood that one box is being filled with matches while one tray is being filled with box parts, so that one box is completed at each movement of the table.

The match-feeding apparatus is seen in Fig. 2, at the left of the machine and consists (Figs. 11 and 12) of a hopper 49, under which one of the trays will stand when the table is at rest, this hopper being in such a position that the lower end of it will only be above the drawer part of the match-box in the tray. This hopper, it will be understood is supposed to be kept full of matches in any manner desired, one of which will be hereinafter described. The lower end of the hopper is normally closed by means of a sliding-plate 50, connected to a reciprocating frame 51, sliding in suitable bearings arranged upon the outside of the hopper and operated from a cam 52, through a suitable system of links and levers 53. There is a finger $b$, slidably arranged above and opposite the slide 50. $b^1$, is a bell-crank lever of which one end is connected with the shank of the finger $b$, and the other end with the frame 51, as by a spring as shown. Normally the spring $b^2$, holds the finger in retracted position, but when the slide 50, underlies the matches the finger overlies its end. The finger facilitates the operation of the slide. Just before the slide 50, moves out from underneath the hopper the table rises so as to bring the match-box as close as possible to the hopper, then the slide and finger move outward allowing the matches to flow downward into the match-box, and before the table begins to move the slide and finger move backward into its normal position, cutting off the supply of matches and leaving the drawer part of the match-box even full.

In order to agitate the matches within the hopper so that they will flow easily and not clog, I arrange upon each side of the hopper the angular strips 54, each of which is pivoted at its lower end to the inside of the hopper, the upper ends turning at right-angles, extending through openings in the hopper and connected to bars 55, which bars are pivoted at their ends to links 56. One of said links being pivoted to a bell-crank lever 57, which in turn is pivoted to the hopper, the other member of the bell-crank lever being provided with a pin 58, extending through an angular slot 59, formed through the slide-bar 23. Thus it will be seen that by properly shaping the slot 59, the links 56, will be reciprocated back and forth, operating the agitators 54.

From the match-delivering apparatus the filled boxes pass to the match evener. This consists Fig. 1 and 16, of a plate $c$, carried by a bracket $c^1$, rising from the bed-plate of the machine. This plate conforms in size to the size of the box-drawers and when the rising table lifts the trays it evens the matches in the box part.

From the evener the box-parts pass to the box assembling apparatus—this is located for convenience at the front of the machine and consists of a plunger 60, fitted to slide radially with respect to the table in a suitable standard 61, arising from the bed-plate. This plunger is operated from a cam 62, located upon the cam-shaft through a suitable system of links and levers 63. Pivoted above the plunger, Fig. 8, at its outer end is an arm 64, to the inner or free end of which is secured a flat thin blade 65.

When the tray containing the filled box is moving into position in front of the box-assembling apparatus the arm 64, and blade 65, are in the position shown in dotted lines in Fig. 7, being held in this position by the lug 66, secured to the arm 64, resting upon the top of a plate 67, which plate can be moved laterally by means of the cam 68 (see Fig. 2), operating upon the lever 69, which is connected to said plate. As soon as the table comes to a rest this plate 67, is moved outward laterally allowing the arm 64, to drop, and the blade 65, will come on top of the matches within the box and press downward upon the same through the agency of the spring 70, as shown in Fig. 7, then the cam 62, operates to force the plunger 60 inward, and the inner end of the plunger coming in contact with the drawer part of the box forces this drawer part into the case, the blade passing in underneath the top of the case, and when the plunger 60 and arm 64, moves inward the roller 71, carried by the arm 64, travels over the horizontal member of the bell-crank lever 72, and as soon as the drawer of the match-box is within the case this bell-crank lever 72, is rocked through the cam 73, located upon the cam-shaft (see Fig. 7), and the arm 64, will be raised to the position shown in Fig. 8, and the blade 65, being within the box of course the box will be raised with it, as shown in Fig. 8.

The next operation of the machine is to remove the filled box. This is accomplished by means of spring jaws or arms 78 and 79 carried by a plate 74 secured on the outer end of an arm 75 (see Fig. 1), which arm is pivoted to the bed-plate at the point 76, and this arm is so located and shaped that the spring jaws can be brought directly over the filled box after it has been assembled, and then this arm will be moved by the cam 77, (see Fig. 7), so that the spring jaws 74, will be swung beyond the periphery of the table and the jaws automatically opened to allow the box to drop into the proper receptacle. The spring jaws or arms 78 and 79 are (Fig. 10,) oppositely disposed, and these arms or jaws depend from the plate 74 to which the arm 75 is attached, and the lower ends of these arms or jaws are up-turned to form the ledges 80, and the arm 78, is stationary with the main portion or top plate 74 and the arm 79 is pivoted at its upper end to the main portion or plate 74; the movable arm 79, is held in its normal position by means of a spring 81, and when the box is raised to the position shown in Fig. 8, the jaws or arms will be directly over the box, and when the box is raised it will spring the arm or jaw 79 outward because the up-turned ends 80, are inclined, and when the box has passed these up-turned ends the spring 81, will cause the arms to resume their normal position, and then when the blade 65, is withdrawn from the box by the retrograde movement of the plunger 60, the filled box will rest upon the up-turned ends 80, as shown in Fig. 10.

In order to prevent the box being carried outwardly when the blade 65 is withdrawn, lugs 82, depend from the arm 75, which lugs come in contact with the front end of the filled box, said lugs straddling the blade 65, so that the box will not be carried outwardly with the blade. When the blade 65, has been removed the arm 75 will be swung outward beyond the table, and when in the proper position a lug 83, extending upward from the movable arm 79, will come in contact with the contact point 84, which is secured to the bed-plate, and coming in contact with this contact point the movable arms 79 will be moved outward and allow the box to drop into the proper receptacle. In order to insure that the box will be removed each time from the jaws a deflector-plate 85 may be secured to the framework so that the same will strike the box at the proper point and force the same from between the jaws. Of course this deflector-plate may not be necessary in all cases and is only used as a precaution.

In Fig. 7, 86, represents a small plate, up-turned slightly at its forward end, which is secured to the outer end of an arm 87, secured to the arm 75. As the arm 64, and roller 71, travels toward the center of the machine the arm 87, will be swinging away from the machine, and this plate 86 will strike the roller 71, and so guarantee that the arm 64, and blade 65, will be held downward in their proper position until the point of the blade is underneath the top of the case of the matchbox.

88, are guides which extend over the edge of the tray while the box parts are being assembled, as shown in Figs. 1 and 9, so as to prevent the box parts from rising as the drawer of the box is inserted in the case. These guide-plates 88, are attached to the ends of springs 89, secured to the frame 61, but, of course, when the filled box is to be raised these guide-plates 88, must be spread, and in order to accomplish this I provide upon the plunger 60, a spreader-plate 90, which comes in contact with beveled lugs 91, secured to the guide-plates 88, and spreads these plates, as clearly shown in Fig. 9.

A means for supplying the hopper 49, with matches, comprises an endless apron 92, shown in Fig. 12, but omitted from the other figures for the sake of clearness. This apron may be driven from a counter-shaft 93, Fig. 1, which in its turn is driven from the cam shaft by a belt 94. In cases where the drawer and case parts of the boxes are fed to the hopper 18, in assembled position they are of course delivered to the trays in such position and must be opened before the matches are fed. In Fig. 15, 95, is a bracket having ways in which a rod 96, is slidably mounted. This rod is reciprocated through the intervention of a link 97, by a bell-crank oscillated by a cam on the cam shaft. The rod 96, is downwardly and outwardly curved forming a shank 98 and it is provided with a pusher plate 97ª. The pusher plate 97ª, serves to push the drawer part out of the case part and the shank 98, by engaging the case part insures its proper positioning in respect to the abutment a.

The term feed mechanism will be employed to include means for feeding the articles whether box parts or matches to the trays.

I claim:

1. In a machine of the type recited the combination of feed mechanism, devices including a revoluble table for presenting box carrying trays beneath the same, and means for raising and lowering the table to present the trays to said mechanism and to cause the trays to clear said mechanism, substantially as described.

2. In a machine of the type recited the combination of feed mechanism, a revoluble table provided with box carrying trays and arranged to present the trays beneath the feed mechanism, and means for relatively shifting said parts for raising and lowering the trays to present the same to said mechanism and to cause the same to clear said mechanism, substantially as described.

3. A machine of the type recited comprising a revoluble table provided with box carrying trays, box feeding and box opening and match feeding and box closing mechanisms arranged around the table and above the box carrying trays, and devices for raising and lowering the table as the trays are presented to and withdrawn from the various mechanisms, substantially as described.

4. A machine of the type recited comprising a revoluble horizontal table provided with box carrying trays, box feeding and match feeding mechanisms arranged around the table and above the trays, and means for raising and lowering the table as the trays are presented to and withdrawn from the various mechanisms, substantially as described.

5. In a machine of the type recited a revoluble table with box carrying trays disposed radially thereof and each comprising a floor and a yielding side wall and provided with wings, and abutments for engaging the box parts, substantially as described.

6. In a machine of the type recited a revoluble table provided with box carrying trays disposed radially thereof and each of said carriers having a yielding side wall for holding box parts and said machine provided with devices for springing the yielding side wall to grasp and release the box parts, substantially as described.

7. A machine of the type recited provided with a revoluble table having box carrying trays disposed radially thereof and each comprising a floor and a side wall hinged to the floor, and provided with box part engaging projections, and springs operating upon the side wall, substantially as described.

8. In a machine of the type recited the combination of a box carrying tray provided with walls having abutments for engaging the ends of a box casing and a reduced cross-section for positioning the drawer, a reciprocating opener adapted to engage the box drawer and provided with a shank adapted to engage the housing and position it in respect to the abutment, and means for positioning the tray in respect to the opener, substantially as described.

9. In a machine of the type recited the combination of a revoluble table equipped with a radially disposed open top box carrying tray, a bracket arranged above the box tray and provided with an evener, and means for elevating the tray to bring the matches in the box part which it contains into contact with the evener to level the matches, substantially as described.

10. In a machine of the type recited the combination of a box carrying tray provided with a yielding wall, an arm provided with depending hooks for engaging a box, and a part on the arm for springing the yielding wall of the tray to release the box, substantially as described.

11. In a machine of the type recited the combination of a revoluble table provided with radially arranged box carrying trays adapted to hold the box parts in open position, and mechanism including a plunger for closing the box parts, and a slidable and turnable blade adapted to pass over the matches and into the box housing and to lift the closed box, substantially as described.

12. A machine of the type recited provided with a match hopper open at its base, a plate provided to extend across and open and close the opening at the base of the hopper, and a finger arranged to contact with the top surface of the end of the plate and to move in a direction opposed to the direction of motion of the plate to keep the end of the plate clear of matches, and means for actuating said parts, substantially as described.

13. In a machine of the type recited the combination of box carrying trays, a hopper arranged to feed box housings into the trays, a pair of yieldingly supported plates having inturned lower edges adapted to detain and release box drawers, an arm for drawing drawers between said plates and for positioning the drawers in the trays when the plates are sprung apart, mechanism for springing the plates for feeding the trays and means for operating said arm, substantially as described.

14. In a machine of the type recited the combination of box carrying trays, means for feeding box housings to the trays, a pair of yieldingly supported arms having inturned fingers adapted to hold box drawers and arranged above the trays, means for springing the fingers apart to release the drawers a conveyer for feeding box drawers, a rocking finger for arresting the drawers, an arm for engaging the drawers singly and feeding them between said plates and also to the trays when the plates are sprung apart, and operating mechanism for said arm and rocking finger, substantially as described.

In testimony whereof I have hereunto signed my name.

EMIL EICHLER.

In presence of—
W. J. JACKSON,
FRANK E. FRENCH.